United States Patent [19]

Da Silva

[11] 4,098,498
[45] Jul. 4, 1978

[54] VARIABLE RESILIENCE VEHICLE SUSPENSION

[76] Inventor: Joaquim Jorge Da Silva, Rua Breno Guimãraes No. 118, Rio de Janeiro, state of Rio de Janeiro, Brazil

[21] Appl. No.: 691,556

[22] Filed: May 25, 1976

[30] Foreign Application Priority Data

Aug. 13, 1975 [BR] Brazil .................. 17505178

[51] Int. Cl.² .................. B60G 11/14
[52] U.S. Cl. .................. 267/61 S; 280/724
[58] Field of Search .................. 280/724, 670, 701; 267/60, 61 R, 61 S

[56] References Cited

U.S. PATENT DOCUMENTS

| | | | |
|---|---|---|---|
| 2,673,084 | 3/1954 | Blythe | 267/61 S |
| 2,703,234 | 3/1955 | Tapp | 267/61 S |
| 2,801,841 | 8/1957 | Blythe | 267/61 S |
| 3,198,508 | 8/1965 | Melton | 267/61 S |
| 3,591,161 | 7/1971 | Scheublein | 267/61 S |
| 3,674,250 | 7/1972 | Joseph | 267/61 S |
| 3,773,309 | 11/1973 | Carter | 267/61 S |

FOREIGN PATENT DOCUMENTS 187,047  12/1963  Sweden .................. 267/61 S

*Primary Examiner*—Joseph F. Peters, Jr.
*Assistant Examiner*—John A. Carroll
*Attorney, Agent, or Firm*—Michael J. Striker

[57] ABSTRACT

A variable resilience vehicle suspension arrangement has a helical compression spring which includes a plurality of convolutions. An elongated elastically yieldable element is interposed between adjacent convolutions of the helical compression spring and has a central mounting portion provided with an opening in which one of the convolutions of the spring is received. A slit extends between the opening and the external surface of the element and separates a deflectable section of the mounting portion from the remainder of the element so that the convolution can be introduced into the opening through the slit upon deflection of the section. Bifurcated engaging portions are formed at longitudinally spaced ends of the element and laterally surround the respective adjacent convolutions with freedom of relative movement in direction of displacement of the convolutions toward and away from one another during the compression and relaxation of the spring, until the respective adjacent convolutions abut against the engaging portions and deform the element during the further compression of the spring. The elastically yieldable element thus varies the resilience of the helical compression spring in dependence on the extent of compression of the spring.

13 Claims, 4 Drawing Figures

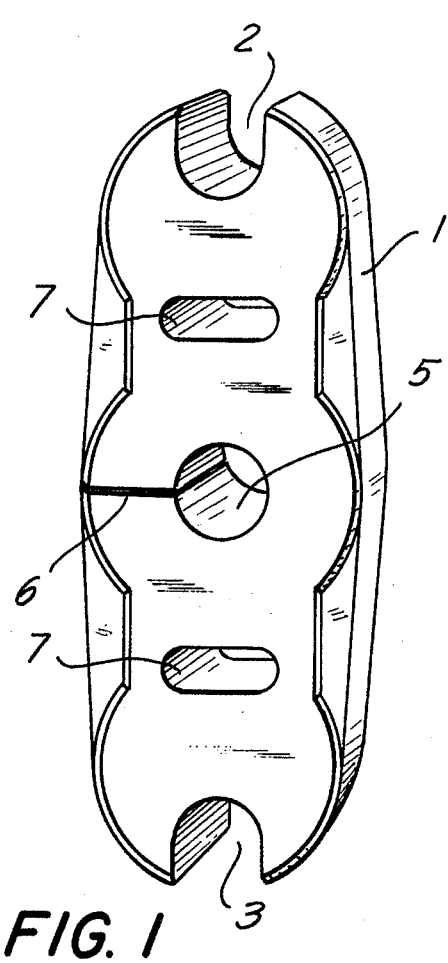
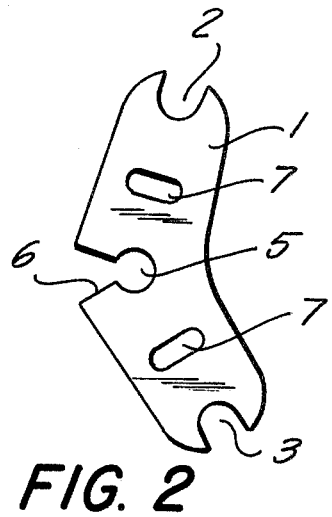
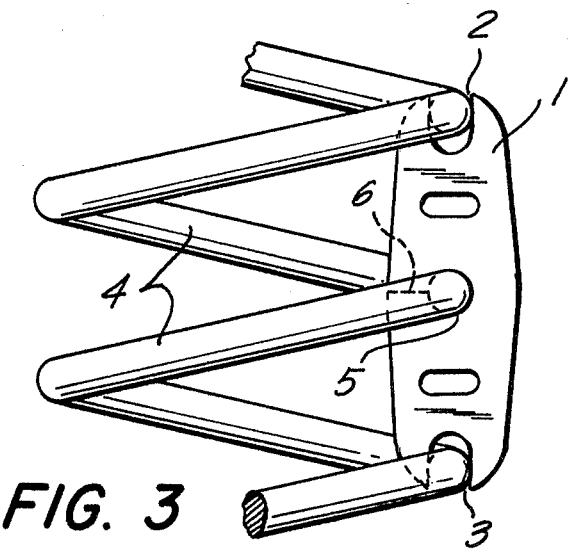
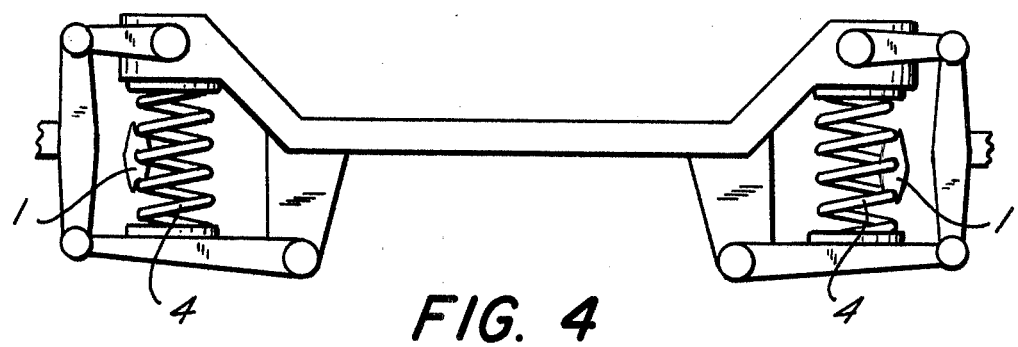
FIG. 1
FIG. 2
FIG. 3
FIG. 4

VARIABLE RESILIENCE VEHICLE SUSPENSION

BACKGROUND OF THE INVENTION

The present invention relates to a vehicle suspension, and more particularly to a car suspension incorporating helical springs.

Vehicle suspensions, particularly automobile suspensions, using helical compression springs are already known and in wide-spread use. The utilization of the vehicle springs in vehicle suspensions has brought about many advantages. More particularly, such suspensions are less complex, more reliable and easier to maintain and repair during the lifetime of the vehicle than other suspensions. Also, such suspensions result in a more comfortable ride for the driver and the passengers of the vehicle, particularly due to the greater elasticity and compressibility of the helical springs as compared to those obtainable by using leaf springs. While such suspensions using helical springs have initially been used only for suspending the front wheels of vehicles, the use of such springs has spread in the last year also to the rear wheels of the vehicles.

As advantageous as such suspensions may be, particularly for ride on well-paved roads, they also have serious drawbacks, particularly when the vehicle is driven over roads of inferior quality. A matter of particular concern is that the higher compressibility or elasticity of the helical springs used in such present-day suspensions may result in a situation where the automobile travelling over roads of inferior quality may conduct excessive lateral or front-to-rear movements when the wheels of the vehicle come into contact with irregularities of the surface of the road. This is particularly true when the surface of the road has a wavy configuration which can result from erosion of the pavement due to weather influences or due to the passage of many and/or heavy vehicles over the road. Such movements of the car are not only very uncomfortable to the driver and the passengers of the automobile, but can also result in an impairment or a partial loss of control over the vehicle. Therefore, in order to avoid such excessive movements, the car must be driven on inferior-quality roads at very low speeds. However, even at slow speeds the ride in a car equipped with such a suspension is rather uncomfortable due to the frequent and substantial movements of the car in various directions. A way of avoiding this disadvantage would be to either permanently stiffen the helical springs or to replace them by other springs having a lower degree of compressibility. However, these expedients would result in a less comfortable ride not only over inferior roads, but also over superior roads.

SUMMARY OF THE INVENTION

Accordingly, it is a general object of the present invention to avoid the disadvantages of the prior-art arrangements.

More particularly it is an object of the present invention to provide a vehicle suspension which gives a comfortable ride on both superior and inferior roads.

It is a further object of the present invention to provide a car suspension using helical springs which is simple in construction and reliable in operation.

A concomitant object of the present invention is to provide a suspension for use in motor vehicles which prevents excessive movements of the car even on bad roads.

In pursuance of these objects and others which will become apparent hereafter, the present invention resides, briefly stated, in a vehicle suspension, in a combination which comprises at least one helical compression spring of a given resilience; and means for varying the resilience of the helical compression spring in dependence on the extent of compression of the spring.

In a currently preferred embodiment of the present invention, the varying means includes at least one elastically yieldable element interposed between adjacent convolutions of the helical compression spring, the elastically yieldable element being mounted on one convolution of the helical compression spring for shared movement therewith and having at least one engaging portion against which an adjacent convolution abuts upon compression of the spring to a predetermined extent to deform the element during further compression. According to a further aspect of the present invention, the engaging portion is bifurcated and laterally surrounds the adjacent convolution with freedom of relative movement in the direction of the displacement of the convolutions toward and away from one another during the compression and relaxation of the spring when the same is compressed to less than the predetermined extent.

The elastically yieldable element further has a mounting portion which has an opening substantially corresponding in shape to the cross section of one convolution, the mounting portion having a slit which extends between the opening and the external surface of the element and separates a deflectable section of the mounting portion from the remainder of the element so that the one convolution can be introduced into the opening through the slit upon deflection of the above-mentioned section. The element may be elongated and may have longitudinally spaced ends. The mounting portion is then situated in a central region of the elongated element, the engaging portion is provided at one of the ends, and an additional engaging portion is situated at the other end of the elongated element and is adapted to engage an additional adjacent convolution of the spring located to the other side of the one convolution from the first-mentioned adjacent convolution. Preferably, the distance between the ends of the elongated element substantially corresponds to the distance between the first-mentioned adjacent convolution and the additional adjacent convolution in a relaxed condition of the spring. The elastically yieldable element may be of a flat configuration, and the engaging portion may have a slot which extends in the above-mentioned direction and has a bottom surface which substantially corresponds in shape to the cross-section of the adjacent convolution, and side surfaces which are spaced from one another by a distance substantially corresponding to the cross-sectional diameter of the adjacent convolution, the depth of the slot exceeding the cross-sectional diameter of the adjacent convolution.

The elastically yieldable element which has been described above does not interfere with the inherent resilience of the helical spring until the latter is compressed to a predetermined extent. Thus, while the automobile travels over a straight stretch of a road of superior quality, only the resilience of the helical spring will come into the picture. On the other hand, when the compression of the spring reaches and exceeds the predetermined extent, the adjacent convolution abuts against the curved bottom portion of the slot of the engaging portion, and from then on the further compression of the helical spring will result in an elastic deformation of the elastically yieldable element. Thus, the compression force of the helical spring is augmented by the deformation force of the elastically yieldable element during the periods of excessive compression of the helical spring. Consequently, when the vehicle travels over roads of inferior quality, through curves or the like, the return force of the helical spring will be enhanced by the action of the elastically yieldable element and the tendency of the vehicle to conduct excessive movements under such circumstances will be effectively counteracted. This, of course, results in an improvement of the maneuverability of the vehicle and of the control thereof.

A further important feature of the present invention may be seen in the fact that the elastically yieldable element can be used in connection with any pre-existing vehicle suspensions using helical springs, without any need for modifying the helical spring or any other components of the suspension prior to mounting of the elastically yieldable element on the helical spring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of a currently preferred embodiment of the elastically yieldable element of the present invention;

FIG. 2 is a side elevational view of the element of FIG. 1, on a reduced scale, illustrating how the element is deflected prior to mounting thereof on the helical spring;

FIG. 3 is a fragmentary side elevational view of a helical spring with the elastically yieldable element of FIG. 1 mounted thereon; and FIG. 4 is a somewhat diagrammatic front elevational view of a helical-spring suspension of a vehicle with the elements of FIG. 1 mounted on the helical springs.

DESCRIPTION OF THE PREFERRED EMBODIMENTS

Referring now in detail to the drawing, and first to FIG. 1 thereof, it may be seen that the elongated elastically yieldable element of the present invention has been designated with the reference numeral 1. The element 1 is made of a suitable elastically yieldable material, such as natural or synthetic rubber, or of synthetic plastic material having the desired resilient properties.

The element 1 is formed, at its ends, with slots 2 and 3, respectively, the slots 2 and 3 having such dimensions that a section of a convolution of a spring 4 (compare FIG. 3) can be received in the respective slot 2 or 3 with freedom of movement relative to the element 1 in the longitudinal direction of the latter. The element 1 further has a central opening 5 the shape of which corresponds to the cross-sectional configuration of a convolution of the spring 4. A slit 6 extends between the opening 5 and the exterior of the element 1, and the respective convolution of the spring 4 can be introduced into the opening 5 through the slit 6 upon deflection of the upper and lower halves of the element 1 relative to one another as particularly illustrated in FIG. 2. The element 1 may further be provided with additional openings 7 which serve the purpose of modifying the resiliently yieldable properties of the element 1 so as to have the desired values.

As already mentioned above, FIG. 2 illustrates the element 1 in its deflected position which it assumes preparatory to and during the introduction of the respective convolution of the spring 4 into the opening 5 through the slit 6. Once the respective convolution of the spring 4 is received in the opening 5, the deflecting force is discontinued and the adjacent upper and lower convolutions of the spring 4 are introduced into the respective slots 2 and 3. This can be done either by applying a force on the adjacent convolutions of the spring 4 so as to spread them apart from the central convolution which is accommodated in the opening 5, or by deflecting one leg of a bifurcated engaging portion which surrounds the respective slot 2 or 3 out of the way of relative movement of the respective upper or lower parts of the element 1 with respect to the upper or lower adjacent convolution of the spring 4. After all this is done, the element 1 is mounted on the helical spring 4 as illustrated in FIG. 3, with the central convolution being received in the opening 5, and with the adjacent convolutions being received in the slots 2 and 3 with freedom of movement in the longitudinal direction of the element 1.

The application of the element 1 to the spring 4 of a suspension of a motor vehicle is illustrated, in a somewhat diagrammatical fashion, in FIG. 4. Only those parts of the suspension which are necessary for an understanding of the present invention have been illustrated. As may be seen, the elastically yieldable element 1 is mounted on the outer side of the spring 4, that is on the side which faces toward the wheel which is mounted on the frame of the vehicle using the helical-spring suspension which has been discussed above.

It will be seen that, so long as the vehicle travels over a relatively level road, that is, so long as the adjacent convolutions are received in the slots 2 and 3 with freedom of relative movement toward the central convolution, only the resilience of the helical spring 4 will determine the response of the suspension to compression forces which may act on the spring 4. On the other hand, once the spring 4 is compressed to such an extent that the adjacent convolutions abut against the bottom portions of the respective slots 2 and 3, any further compresion of the spring will result in a deformation of the elastically yieldable element 1 so that the resistance of the latter to deformation will be superimposed upon the inherent resilience of the spring 4 and, consequently, the spring will be stiffened.

The elastically yieldable element 1 can be manufactured in different sizes so as to be compatible with vehicle springs of different dimensions. The dimensions of such an element 1 will be so selected that the element 1 not only can be easily mounted on the corresponding spring 4, but also will have the desired resistance to deformation so as to stiffen the spring in a desired manner. Of course, the resistance of the element 1 to deformation may be reduced by providing the additional openings 7 of selected shapes, as already mentioned above.

It will be understood that each of the elements described above, or two or more together, may also find a useful application in other types of constructions differing from the types described above.

While the invention has been illustrated and described as embodied in a variable-resistance vehicle suspension, it is not intended to be limited to the details shown, since various modifications and structural changes may be made without departing in any way from the spirit of the present invention. So, for instance, more than one of the elements 1 can be used in connection with a respective spring 4, if so desired, so as to further influence the inherent resilience of the spring 4.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a suspension to be mounted in a vehicle, particularly a motor vehicle, a combination comprising at least one helical compression spring which is resiliently compressed from an initial partially compressed condition attained when only the attributed part of the full weight of the vehicle acts on the suspension and thus subjects said spring to an initial compression force, the compression progressively increasing through a first and a second range of increasingly compressed conditions of said spring in dependence on additional compression forces acting on said spring during the use of the vehicle; and varying means mounted on said spring and so arranged as to be inoperative within said first range while becoming operative only in said second range to augment the resistance of said spring to compression in said second range as compared to that existing in said first range.

2. A combination as defined in claim 1, wherein said varying means includes at least one resiliently yieldable element interposed between adjacent convolutions of said helical compression spring.

3. A combination as defined in claim 2, wherein said elastically yieldable element is mounted on one convolution of the helical compression spring for shared movement therewith and has at least one engaging portion against which an adjacent convolution abuts upon compression of said spring into said second range to deform said element during further compression.

4. A combination as defined in claim 3, wherein said engaging portion is bifurcated and laterally surrounds said adjacent convolution with freedom of movement relative thereto in direction of displacement of said convolutions toward and away from one another during the compression and relaxation of said spring when the latter is compressed within said first range.

5. A combination as defined in claim 4, wherein said element is substantially flat.

6. A combination as defined in claim 4, wherein said engaging portion has a slot extending in said direction and having a bottom surface substantially corresponding in shape to the cross section of said adjacent convolution, and side surfaces spaced from one another by a distance substantially corresponding to the cross-sectional diameter of said adjacent convolution, the depth of said slot exceeding said cross-sectional diameter.

7. A combination as defined in claim 4, wherein said elastically yieldable element has a mounting portion having an opening substantially corresponding in shape to the cross-section of said one convolution, said mounting portion having a slit extending between said opening and the external surface of said element and separating a deflectable section of said mounting portion from the remainder of the element so that, upon deflection of said section, said one convolution can be introduced into said opening through said slit.

8. A combination as defined in claim 7, wherein said deflectable section and said remainder have respective contact surfaces bounding said slit; and wherein said contact surfaces are in contact with one another when said mounting portion is mounted on said one convolution so that the former circumferentially completely surrounds the latter.

9. A combination as defined in claim 7, wherein said element is elongated in said direction and has longitudinally spaced ends; wherein said mounting portion is situated in a central region of said elongated element; wherein said engaging portion is provided at one of said ends; and further comprising an additional engaging portion similar to said engaging portion and situated at the other end of said elongated element and adapted to engage an additional adjacent convolution of said spring located to the other side of said one convolution from said adjacent convolution.

10. A combination as defined in claim 9, wherein the distance between said ends of said elongated element substantially corresponds to the distance between said adjacent convolution and said additional adjacent convolution in relaxed condition of said spring.

11. A combination as defined in claim 9, wherein said engaging portions and said opening are aligned with one another in said direction.

12. A combination as defined in claim 11, wherein said element has additional openings arranged between said opening and said engaging portions and in alignment therewith in said direction, said additional openings determining the resistance of said element to deformation.

13. In a suspension to be mounted in a vehicle, particularly a motor vehicle, a combination comprising at least one helical compression spring which is resiliently compressed from an initial partially compressed condition attained when only the attributed part of the full weight of the vehicle acts on the suspension and thus subjects said spring to an initial compression force, the compression progressively increasing through a first and a second range of increasingly compressed conditions of said spring in dependence on additional compression forces acting on said spring during the use of the vehicle; and at least one elongated resiliently deformable element having a mounting portion adapted to be mounted on one convolution of said spring and two engaging portions each of which is bifurcated and has lateral and bottom surfaces which together bound a respective elongated slot on the respective engaging portion, which extends longitudinally of said element and is adapted to receive a respective one of the two convolutions of said spring which are immediately adjacent to said one convolution, with freedom of movement of the respective adjacent convolution within and longitudinally of said respective slot so long as said spring is compressed within said first range, whereby the resistance of the combination in said first range to said additional compression forces corresponds to that of said spring alone, said respective adjacent convolution abutting against said bottom surface bounding said respective slot only when said spring is compressed beyond said first and into said second range, whereby the resistance of said spring to said additional compression forces is augmented in said second range by the resistance of said element to deformation by the compression forces acting thereon.

* * * * *